United States Patent [19]

Fleischer

[11] 4,220,614
[45] Sep. 2, 1980

[54] SOLID SOLUTION CARBIDE NUCLEAR FUELS

[75] Inventor: Leonard R. Fleischer, Pittsburgh, Pa.

[73] Assignee: Westinghouse Electric Corp., Pittsburgh, Pa.

[21] Appl. No.: 629,863

[22] Filed: Apr. 4, 1967

[51] Int. Cl.² .............................................. G21C 21/00
[52] U.S. Cl. .............................. 264/0.5; 252/301.1 R; 176/19
[58] Field of Search ................ 264/0.5; 75/122.7, 204, 75/203; 252/301.1, 301.1 R; 176/69

[56] References Cited
U.S. PATENT DOCUMENTS

| | | | |
|---|---|---|---|
| 3,207,697 | 9/1965 | Benesovsky et al. | 264/0.5 X |
| 3,236,922 | 2/1966 | Isaacs et al. | 264/0.5 |
| 3,284,550 | 11/1966 | Riley et al. | 264/0.5 |

*Primary Examiner*—Peter A. Nelson
*Attorney, Agent, or Firm*—Z. L. Dermer; Edward L. Levine

[57] ABSTRACT

A powder compact of mixed zirconium, carbon and uranium monocarbide powders is heated to melt first the zirconium constituent. The liquid zirconium reacts with the solid phases by a diffusion controlled process to form zirconium carbide and a (U,Zr)C solution. The compact is then heated to a higher temperature to melt the uranium monocarbide to form additional (U,Zr)C solid solution whereby the final product is composed of a single phase homogeneous solid solution.

5 Claims, 1 Drawing Figure

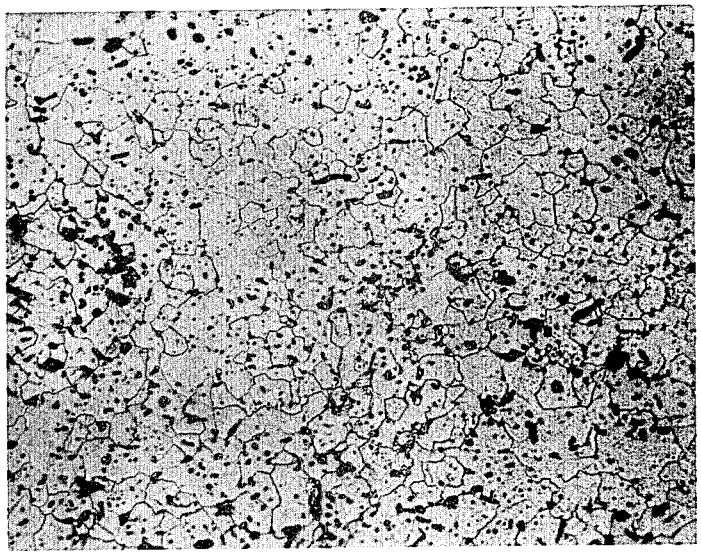

SOLID SOLUTION CARBIDE NUCLEAR FUELS

BACKGROUND OF THE INVENTION

This invention is directed to a process for making solid solution carbide nuclear fuels suitable for use in nuclear rocket engines.

In the present nuclear rocket engines, the fuel, in particulate form, is dispersed in graphite elements. Gas passages are provided through these elements. In operation, hydrogen gas is flowed through the gas passages wherein it is heated to temperatures of about 2200° C. by the fission reaction occurring in the fuel elements. The hydrogen is expelled from the passages at high velocity and provides the propellant force for the rocket. The hydrogen gas and gas-borne particles at such high temperature and high velocity have an extremely corrosive and erosive effect on the presently available nuclear fuels. The performance of present nuclear rocket fuel is limited by hydrogen corrosion.

It has been suggested that the high temperature capability of the fuel could be increased by the addition of an extension portion to the current graphite-base fuel element, made of a uranium-containing carbide. For reasons of nuclear properties, attention has focused upon a solid solution of UC-ZrC for this application. Based on measured rates of carbon diffusion in ZrC the expected weight loss rate for a solid solution carbide fuel has been calculated and found to be superior to the rate for the graphite base fuel.

The major problems associated with the use of the solid solution carbide fuel involve the fabrication of suitable fuel bodies, and thermal stress considerations. Fabrication by arc-melting, liquid state carburization of metal alloys, and powder consolidation and sintering techniques have not been entirely successful because of non-homogeneity, the presence of a second phase ($UC_2$,C), incomplete solid solution, excessive interstitial content (C,$O_2$), and unacceptably wide variation in stoichiometry. Most of these problems lead to excessively brittle, or crumbly bodies with poor thermal shock resistance. In addition, it was found that dispersions of (U,Zr)C solid solution in more ductile refractory metals are generally incompatible with the matrix metals.

SUMMARY OF THE INVENTION

In the process of the invention a compact of the powders of the several constituents zirconium, uranium monocarbide and carbon is formed and then subjected to heating to progressively higher temperature stages whereby zirconium is first melted. By interdiffusion of the zirconium with the other solid constituents present, it is entirely consumed in forming a higher melting component. Thereafter, the temperature is increased so that the uranium monocarbide is heated to its melting point and, similarly, by interdiffusion with the other constituents present, there is formed a single phase homogeneous solid solution.

In making nuclear fuel compacts in accordance with this invention, the powder starting materials are elemental zirconium, carbon and uranium monocarbide, and the high temperature homogenization steps involve sequentially melting the zirconium and the uranium carbide, and allowing carburization and homogenization to occur in the liquid phase in each stage.

In each stage the liquids are consumed by reaction with the solid portion of the fuel compact. First the zirconium is melted (M.P.=1852° C.) and solidifies by the formation of (U,Zr)C solid solution and ZrC. Then the uranium monocarbide is melted (M.P.=2350° C.) and, in forming the solid solution (U,Zr)C, completes the homogenization. The resulting solid is homogeneous and, since the carbon content is controlled by the amount of carbon in the starting powders, is single phase.

It is the object of this invention to provide a process for making (U,Zr)C homogeneous single phase solid solution fuel elements.

Other and further objects of the invention will be apparent from the following description.

The FIGURE is a photomicrograph of the fuel material made in accordance with the invention after undergoing a hydrogen corrosion test.

DESCRIPTION OF THE PREFERRED EMBODIMENTS

A powder mixture consisting, by weight, of 70.35% zirconium (−320 mesh), 8.23% graphite flour (−325 mesh) and 21.42% uranium monocarbide (−270 mesh) is blended and hot pressed. The pressing cycle utilizes the simultaneous application of pressure and heating. The die and the compacted powders therein are heated first to 1900° C. to melt the zirconium and held for 30 minutes. The temperature is then raised to 2400° C. to melt the uranium monocarbide and held for 30 minutes. Under the applied pressure of from 2 to 10 tons per square inch the liquid phases flows into the pore space so that a density of 90% or better of theoretical density is achieved. The pressure is reduced prior to cooling to avoid excessive residual stresses. The compacts made by this process are sound and uncracked with a shiny metallic surface luster.

Fuel elements made in accordance with the above described procedure were examined to determine their structure, since the thermal shock resistance required demands a single phase, homogeneous carbide solid solution. The photomicrograph of the FIGURE shows that a homogeneous carbide solid solution type of structure is produced by the process of this invention. Back reflection X-ray patterns were taken and the sharpness of the lines gave further indication of the homogeneity of this solid solution.

Strength under compressive loading is a function of porosity; only materials which are close to the theoretical density have been able to withstand the axial loading applied in hydrogen corrosion testing. In the corrosion test furnace, in a test designed to approach in some respects actual conditions in a nuclear engine, the specimen undergoing test is held between two electrodes. A load is applied through a movable top electrode to maintain an electrical contact and counteract gas pressures; the loading on the sample over and above the gas pressure is about 300 psi. The sample is heated by its own electrical resistance. High pressure hydrogen flows over the surface of the sample. The material illustrated in the FIGURE underwent corrosion testing as described. The temperature of the sample was 2300° C. and the hydrogen pressure was 500 psi. These conditions were held for 30 minutes. The initial weight of the sample was 17.44 grams. The weight lost was 1.5 mg. with 7.6 $cm^2$ surface exposed. For comparison, a sample of niobium carbide coated with a commercial graphite was corrosion tested under the same conditions. Its weight loss was 24.2 mg.; more than an order of magnitude greater than that of the carbide solid solution of this invention.

After the corrosion test an X-ray lattice parameter measurement in the center of the (U,Zr)C test specimen gave a measurement of 4.726 angstroms which corresponds to a composition of 11 mole % UC—89 mole % ZrC. The lines were sharp, indicating a high degree of homogeneity. The exterior surface of the sample produced lines which were relatively broad; the extremes of the lines indicated a lattice parameter range of 4.71 to 4.72 angstroms. This broadening of the lattice parameter range is apparently the result of non-uniform decarburization of the surface by hydrogen during the test.

Since heating to test temperature was accomplished in a period of the order of 3 to 4 minutes, and cooling from 2300° C. to 1500° C. was done in less than a minute, the fuel material was subjected to a condition of thermal shock to a substantial degree. The fuel material survived these severe conditions without cracking indicating that the (U,Zr)C fuel material possesses reasonable resistance to thermal shock.

In addition to the hot pressing process described above, it has also proved possible to cold press the constituent powders, remove the compact from the die, and heat treat.

As an example of the cold pressing technique, the powder mixture of zirconium, carbon and uranium monocarbide was thoroughly blended with a carbonaceous binder having relatively volatile components, such as Carbowax. The desired shape is then obtained by compaction in a press, or by extrusion. The green body is slowly heated to 600° to 800° C. to remove the volatile components of the binder. The compact is then sintered in vacuum at 1500° C. to obtain a relatively dense coherent body. Thereafter the compact is heated to 1900° C. and held at that temperature for 30 minutes to melt the zirconium and permit interdiffusion. While the zirconium is in the liquid state the other, solid constituents (carbon, uranium monocarbide) maintain the shape of the body. The compact is then heated to 2400° C., and held at that temperature for 30 minutes to melt the uranium monocarbide and permit interdiffusion. While the uranium monocarbide is in the liquid state, the solid constituent (U,Zr)C and ZrC maintain the shape of the component. The product of this process is composed of a homogeneous, single phase, solid skeleton surrounding a network of open porosity. The amount of porosity can be controlled to some extent, particularly by the density obtained in the initial compaction, but the material tends to have greater porosity than that obtained by the hot pressing technique.

It will be understood that while the preferred embodiments of the present invention have been described, such are capable of variation and modification by those skilled in the art, and I do not wish to be limited to the precise details set forth, since many such variations and modifications will fall within the essential spirit and scope of this invention.

I claim as my invention:

1. A method for making a nuclear fuel element composed of a (U,Zr)C solid solution comprising the steps of;
   (a) forming a compact from a mixture of zirconium, carbon and uranium monocarbide powders,
   (b) heating the compact initially to a temperature sufficient to melt only the zirconium,
   (c) holding the compact at this temperature for a time sufficient to entirely consume the liquid zirconium by interdiffusion with the other constituents to form zirconium carbide and a (U,Zr)C solid solution,
   (d) heating the solid compact to a second higher temperature sufficient to melt the uranium monocarbide, and
   (e) holding the compact at said higher temperature for a time sufficient to completely consume the liquid uranium monocarbide by interdiffusion with the solid constituents of the compact to form (U,Zr)C solid solution whereby the compact is composed of a single phase homogeneous solid solution of (U,Zr)C.

2. The method of claim 1 wherein the temperature at which the first heating step (b) is about 1900° C., and the temperature of the second heating step (d) and of the holding step (e) is about 2400° C.

3. The method of claim 1 wherein the compact is formed under a pressure of from about 2 to 10 tons per square inch and is maintained under a pressure in this range during the heating steps.

4. The method of claim 3 wherein the temperature at which the first heating step is conducted is about 1900° C., and the temperature of the second heating step is about 2400° C.

5. The method of claim 4 wherein the duration of the holding period at that temperature is about 30 minutes in each of the holding steps (c) and (e).

* * * * *